(12) United States Patent
Wu et al.

(10) Patent No.: US 11,181,467 B1
(45) Date of Patent: Nov. 23, 2021

(54) ALL-GLASS OPTICAL ATOM-CHAMBER WITH A VACUUM HIGHER THAN $1\times10^{-8}$ PA AND MANUFACTURING METHOD THEREOF

(71) Applicants: East China Normal University, Shanghai (CN); Beijing Xinnan Zhike Optoelectronics Technology Co., Ltd., Beijing (CN)

(72) Inventors: Yuelong Wu, Shanghai (CN); Haibin Wu, Shanghai (CN); Xin Li, Shanghai (CN); Caiyin Pang, Shanghai (CN); Rui Li, Shanghai (CN); Kun Li, Shanghai (CN); Yang Rui, Shanghai (CN)

(73) Assignees: EAST CHINA NORMAL UNIVERSITY BEIJING, Shanghai (CN); XINNAN ZHIKE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/363,782

(22) Filed: Jun. 30, 2021

(30) Foreign Application Priority Data

Jul. 1, 2020 (CN) .......................... 202010620785.8

(51) Int. Cl.
*G02B 1/12* (2006.01)
*G01N 21/01* (2006.01)

(52) U.S. Cl.
CPC ............... *G01N 21/01* (2013.01); *G02B 1/12* (2013.01)

(58) Field of Classification Search
CPC .................................. G01N 21/01; G02B 1/12
See application file for complete search history.

(56) References Cited

U.S. PATENT DOCUMENTS

2005/0199871 A1* 9/2005 Anderson .............. G21K 1/006
257/14

FOREIGN PATENT DOCUMENTS

| CN | 101439843 A | * | 5/2009 |
| CN | 206531978 U | * | 9/2017 |
| CN | 112781786 A | * | 5/2021 |
| JP | 2006007149 A | * | 1/2006 |

* cited by examiner

*Primary Examiner* — Marcus H Taningco
(74) *Attorney, Agent, or Firm* — Tutunjian & Bitetto, P.C.

(57) ABSTRACT

An all-glass optical atom-chamber with a vacuum higher than $1\times10^{-8}$ Pa and a manufacturing method thereof are provided. The all-glass optical atom-chamber includes an optical vacuum chamber, at least one conduit, optical window sheets, at least one vacuum adapter, and pressing sheets. The optical vacuum chamber is a polyhedron with a plane of any shape; the plane of the polyhedron is provided with an optical window therein. Holes of the optical windows extending into the polyhedron form a same inner chamber. Each of the optical window sheets is fixed on respective optical windows. One end of each of the at least one conduit is fixedly connected to the optical vacuum chamber. The other end of the at least one conduit is connected to one end of the at least one vacuum adapter in one-to-one correspondence through a respective pressing sheet of the pressing sheets.

8 Claims, 4 Drawing Sheets

ALL-GLASS OPTICAL ATOM-CHAMBER WITH A VACUUM HIGHER THAN 1×10⁻⁸ PA AND MANUFACTURING METHOD THEREOF

CROSS REFERENCE TO RELATED APPLICATION

This patent application claims the benefit and priority of Chinese Patent Application No. 202010620785.8 filed on Jul. 1, 2020, the disclosure of which is incorporated by reference herein in its entirety as part of the present application.

TECHNICAL FIELD

The present disclosure relates to the field of optical experimental equipment, in particular to a quartz-glass integral optical chamber with an ultra-high vacuum and a manufacturing method thereof, which is an ultra-high-vacuum all-glass optical chamber that can realize coatings on both of inner and outer surfaces of all optical windows thereof, i.e. an all-glass optical atom-chamber with a vacuum higher than $1\times10^{-8}$ Pa and a manufacturing method thereof.

BACKGROUND ART

Ultra-high vacuum provides a basis for scientific researches on various surfaces, material growth and device applications, and is also an experimental basis for research platforms of various cold atoms and molecules. Various fields are involved, specially such as semiconductors, condensed matter physics, chemistry, new materials research and biological sciences.

Generally speaking, ultra-high vacuum systems include vacuum pumps, vacuum gauges, vacuum chambers and other components. A purpose of the ultra-high vacuum system is to achieve an ultra-high vacuum environment, i.e., a vacuum is higher than $10^{-8}$ Pa. In the ultra-high vacuum system, factors such as a leakage rate of the vacuum chamber and an amount of gas discharged through inner walls, may limit the ultimate vacuum degree of the vacuum chamber. At present, the vacuum chambers are generally made of stainless steel. In order to achieve entering of control laser into the vacuum or to collect an optical signal from the vacuum, it is necessary to add glass vacuum windows to a stainless steel chamber.

Stainless steel materials inevitably cause weak magnetization due to their metal magnetic properties. As a result, there is an additional magnetic field inside the vacuum, and such magnetic field has the asymmetry in time and space, resulting in a complicated internal magnetic field environment. Moreover, if there is an active magnetic field change in the stainless steel chamber, it will also cause eddy currents in some closed metal circuits on the stainless steel chamber. This further increases the complexity of the magnetic field inside the vacuum chamber.

At present, there are glass high-vacuum chambers reported at home and abroad, and optical windows of the chambers can only be coated on outer surfaces thereof. Although they do not contain any metal components, which can keep a relatively clean internal magnetic field, coatings only on one side seriously affects light transmission efficiency, thereby causing serious light pollution.

Conventional bonding includes following bonding.

"High temperature bonding" refers to a bonding that needs to be performed under high temperature and pressure, and sometimes needs a rising temperature to be close to a melting point or softening point of an object: where a disadvantage thereof is that the surface quality and the coating of the optical window are destroyed.

"Low-temperature bonding" refers to a Hydroxide-Catalyzed Bonding, where bonding liquid containing hydroxide during the bonding process hydrolyzes a surface of quartz glass; and a disadvantage thereof is that the surface quality and the coating layer of the optical window are destroyed.

Due to being limited by a current manufacturing method and coating process technology of a chamber, the inner surface cannot be coated, thereby generating additional optical absorption on a medium surface of the optical window sheet. So, not only the detection efficiency is reduced, but also the optical resonant-cavity structure through the window glass is difficult to realize. Additional stray light generated by the inner surface that cannot be coated may also cause additional interference fringes on a working optical path and further increase detection noise.

If the inner and outer surfaces of the optical windows are coated firstly, and then the optical windows are combined into a glass chamber by a chemical adhesive bonding method or a sintering method, the ultra-high vacuum environment and the cleanliness requirements of the chamber cannot be achieved. Regarding use of the chemical adhesive bonding method, the adhesive will volatilize and outgas over time, which will affect an internal vacuum degree. By using the sintering method, a glass sintering-temperature exceeds the tolerance of the coating, which will cause damages to the coating.

Therefore, it has become an urgent scientific research and market demand to design an all-glass-structure vacuum chamber that can realize coatings on both of inner and outer surfaces of an optical window and can realize ultra-high vacuum environment at the same time.

SUMMARY

In view of the disadvantages of the prior art, a purpose of the present disclosure is to provide an all-glass optical atom-chamber with a vacuum higher than $1\times10^{-8}$ Pa and a manufacturing method thereof. All parts of the chamber are made of quartz materials, and assembly of all components of the chamber is completed by a low-temperature bonding process of an optical-contact vacuum-bonding method.

The specific technical solution to achieve the purpose of the present disclosure is provided as follows.

It is provided an all-glass optical atom-chamber with a vacuum higher than $1\times10^{-8}$ Pa. The all-glass optical atom-chamber includes an optical vacuum chamber, at least one conduit, optical window sheets, at least one vacuum adapter, and pressing sheets. The optical vacuum chamber is a polyhedron with planes of any shape. The planes of the polyhedron are provided with respective optical windows. Holes of the optical windows which are extended into the polyhedron form a same inner chamber.

Each of the optical window sheets is fixed on a corresponding one of the optical windows.

An end of each of the at least one conduit is fixedly connected to the optical vacuum chamber, an other end of the at least one conduit is connected to one end of the at least one vacuum adapter in one-to-one correspondence through a respective pressing sheet of the pressing sheets, and an other end of each of the at least one vacuum adapter is connected to a vacuum pump.

A size of each optical window of the optical windows is less than a size of one plane of the planes where the optical window is located. A size of a corresponding one of the optical window sheets is greater than the size of the optical window, and less than or equal to the size of the one plane where the optical window is located.

A light transmission area of each optical window sheet of the optical window sheets is less than or equal to a size of one optical window of the optical windows where the optical window sheet is located. Each of the optical window sheets is planar or non-planar, and the non-planar is spherical; the light transmission area of each of the optical window sheets is coated on both sides.

An annular boss is provided at the other end of each of the at least one conduit.

The at least one vacuum adapter is a metal tubular flange; the one end of each of the at least one vacuum adapter is provided with a first annular groove; the pressing sheets are ring-shaped metal elements, a second annular groove is provided on each of the pressing sheets, and bolt holes are evenly distributed outside the first annular groove and second annular groove.

It is provided a manufacturing method of the all-glass optical atom-chamber with the vacuum higher than $1\times10^{-8}$ Pa, the method includes the following particular steps:

Step 1: Making a first portion of fused quartz material as a profile of the optical vacuum chamber that is the polyhedron with planes of any shape, through an optical cold processing method.

A length of a longest diagonal of the polyhedron is at most 300 mm, a length of a shortest diagonal of the polyhedron is at least 30 mm.

Processing a corresponding one of the optical windows towards inside of the optical vacuum chamber, on each of the planes of the optical vacuum chamber, extending holes of the optical windows form a same inner chamber. A distance from an edge of each optical window of the optical windows to an edge of one plane of the planes where the optical window is located is at least 5 mm, a thinnest portion of walls of the inner chamber formed by grinding towards an inside of the polyhedron has a thickness of at least 8 mm.

Performing a polishing process on inner surfaces of the inner chamber and of the extending holes, where a surface roughness index Ra is less than or equal to 1.2 nm.

Step 2: Grinding and polishing an outer surface of the optical vacuum chamber; the outer surface quality meets: a surface accuracy PV is less than or equal to $\lambda/10$, a surface roughness Ra is less than or equal to 0.6 nm, a surface imperfection B is higher than 10-5 under rules of US military standard MIL-13830A.

Step 3: Forming the optical window sheets from a second portion of the fused quartz material; for each of the optical window sheets, a ratio of a diameter b or a diagonal length to a thickness is less than or equal to 8:1. A size of each of the optical window sheets is less than or equal to a size of one of the planes where the optical window sheet is located.

Where an optical surface of each of the optical window sheets which is within a light transmission area is another plane, a surface accuracy PV of the another plane is less than or equal to $\lambda/10$, a surface roughness Ra of the another plane is less than or equal to 0.6 nm, a surface imperfection B of the another plane is higher than 10-5 under the rules of the US military standard MIL-13830A. The optical surface of each of the optical window sheets which is within the light transmission area is a non-plane, a surface roughness Ra of the non-plane is less than or equal to 0.6 nm, a surface imperfection B of the non-plane is higher than 10-5 under the rules of the US military standard MIL-13830A.

When the optical surface of each of the optical window sheets which is within the light transmission area is the non-plane that is a positive spherical surface or a negative spherical surface. A curvature radius of the positive spherical surface is at least 0.65 times the light transmission area of the optical window sheet. A curvature radius of the negative spherical surface is no more than 1 m.

Coating a light transmission area of each of the optical window sheets at both sides.

Connecting the optical window sheets and the optical windows of the optical vacuum chamber through an optical-contact vacuum-bonding process.

Step 4: Forming the at least one conduit from a third portion of the fused quartz material, an end of each of the at least one conduit is provided with the annular boss. An outer diameter of the at least one conduit is at least 40 mm; a wall thickness of the at least one conduit is at least 6 mm. An outer diameter of the annular boss is at least 5 mm more than the outer diameter of the at least one conduit. An unevenness of a surface of the annular boss is less than or equal to 0.0002 mm. A flat end of each of the at least one conduit is connected to the optical vacuum chamber through the optical-contact vacuum-bonding process.

Step 5: Providing the at least one vacuum adapter that is a metal tubular flange. One end of each of the at least one vacuum adapter is a vacuum CF-flange structure. An other end of each of the at least one vacuum adapter is provided with the first annular groove. Bolt holes are evenly distributed outside the first annular groove. An inner diameter of the first annular groove at the other end of the at least one vacuum adapter corresponds to the outer diameter of the annular boss of the at least one conduit.

Step 6: Providing the pressing sheets that are ring-shaped metal elements with a second annular groove provided on each of the pressing sheets. An inner diameter of the second annular groove corresponds to the outer diameter of the annular boss of the at least one conduit, and other bolt holes are evenly distributed outside the second annular groove. A sum of a thickness of the first annular groove of each of the at least one vacuum adapter and a thickness of the second annular groove of each of the pressing sheets is less than a thickness of the annular boss of each of the at least one conduit by a range of 1-2 mm.

Step 7: Connecting the at least one vacuum adapter and the at least one conduit in one-to-one correspondence, more specially, firstly sleeving a respective pressing sheet of the pressuring sheets on an outer side of each of the at least one conduit and engaging the second annular groove of the respective pressing sheet with the annular boss of the at least one conduit. Placing one coil or two coils of indium wires on a plane of the first annular groove at the other end of the at least one vacuum adapter. Where diameters of the indium wires are within a range of 1.5 to 2 mm. Positioning the annular boss of the at least one conduit within the first annular groove of the at least one vacuum adapter, and screwing bolts into the bolt holes of the at least one vacuum adapter and the other bolt holes of the respective pressing sheet, so that the indium wires are evenly squeezed and an airtight connection is realized between the at least one vacuum adapter and the respective pressing sheet; and obtaining the all-glass optical atom-chamber with the vacuum higher than $1\times10^{-8}$ Pa.

The optical-contact vacuum-bonding process includes the following contents.

(1) Optical polishing: performing a fine optical-surface polishing on surfaces of objects by a classical polishing method; controlling strictly an ambient temperature to be 22±1 degrees centigrade, and a temperature gradient is less than 0.1 degrees centigrade per hour; polishing and grinding the surfaces by using polishing powder obtained by a water separation method, preferably, dissolving ultra-fine polishing powder of 500 mesh in water, stirring fully and depositing for 24 hours, and then taking 10% of ultra-fine particles in an upper layer of the polishing powder after being deposited; wherein surface accuracies PV of the surfaces to be bonded are less than or equal to $\lambda/10$, surface roughness Ra of the surfaces after being polished is less than or equal to 0.6 nm, surface imperfections B of the surfaces are higher than 10-5 under the rules of the US military standard MIL-13830A.

(2) Optical contact: ultrasonically cleaning the surfaces after being polished in the previous step by using deionized water, then further cleaning the surfaces by using alcohol fluid with 99.5% of alcohol, and performing the optical contact under Class 100 of the Old Federal Standard 209E or under Class 5 of the ISO Classification System ISO 14644-1: firstly mixing absolute ethyl alcohol with a purity of greater than 99.9% and petroleum ether with a purity of greater than 99.7% according to a ratio of 9 to 1 to be a mixed liquid; using the mixed liquid and a dust-free cloth to wipe clean the surfaces to be bonded; attaching closely two surfaces of the surfaces to be performed with the optical contact; and applying a pressure of less than 0.2 kg per square centimeter to enable molecules of the two surfaces to attract each other, so as to complete the optical contact.

(3) Vacuum bonding: putting an entire body after being performed the optical contact into a vacuum chamber and vacuuming the vacuum chamber to $10^{-3}$ Pa, heating the vacuum chamber to 220 degrees centigrade at a heating rate of 2 degrees centigrade per min, and maintaining the entire body at 220 degrees centigrade and $10^{-3}$ Pa for 24 hours; then naturally cooling the vacuum chamber to a room temperature; and forming bonds between the objects, wherein a tensile strength between the surfaces after being bonded is greater than 4 MPa.

The beneficial effects of the present disclosure are provided as follows.

The all-glass optical vacuum chamber has a simple structure and the optical window sheets are coated on both sides, which realizes a completely metal-free structure in a working area of the vacuum chamber, so that the working area will not be interfered by a magnetic field of a stainless steel vacuum chamber.

The disclosure adopts a new optical-contact vacuum-bonding process. The bonding process is always carried out in a vacuum environment. A proper temperature and negative pressure environment are conducive to discharge of gas from surfaces of objects to be bonded, thereby realizing a better molecule-molecule bonding between the objects.

The optical-contact vacuum-bonding process of the present disclosure is different from a conventional bonding process. The optical-contact vacuum-bonding process overcomes risks that a quality of the optical window is reduced and the optical window is damaged by a high or low temperature bonding process. A tensile strength between the bonded surfaces is particularly high; an optical surface, a film layer surface and an optical property of the optical window are consistent with those of the optical windows before being bonded.

Through a technical route of the present disclosure, the optical window can be coated on both sides in an ultra-high vacuum environment, and the technical route is suitable for a plurality of applications. For the light transmission window, light transmission efficiency can be effectively ensured, light pollution caused by surface refraction is reduced, and the cleanliness of an optical background of the working area is maintained. A compact window layout of the present disclosure is conducive to reducing an internal vacuum volume, and furthermore conducive to miniaturization of atomic accelerometers, quantum vacuum measurement, quantum repeaters, etc.

The chemical stability is good. Particularly, the optical atom-chamber, the chamber structure and the window sheets are not easy to be polluted and corroded, so they are easy to store and maintain.

Thermal expansion coefficient is very low. Particularly, the chamber structure and the optical window sheets will not be thermally deformed due to temperature changes, and the optical performance thereof is stable.

The vacuum inside the glass vacuum chamber of the present disclosure is higher than $1\times10^{-8}$ Pa, which meets an ultra-high vacuum standard.

An indium wire crimping method is used to realize a transition from the glass chamber to the metal chamber and a connection to other vacuum equipment, so as to ensure the maintenance of ultra-high vacuum.

A shape of the glass chamber can be customized to meet different usage requirements. Compared with a structure of a metal vacuum chamber with window sheets, the glass chamber reduces a lot of adapter structures, and an effective space angle of the glass chamber is larger.

In addition, it should be noted that expressions such as "including", "having" or "with" do not exclude any other features or steps. Furthermore, expressions such as "a" "an" or "the" that refer in the singular to steps or features do not exclude a plurality of features or steps—and vice versa.

DETAILED DESCRIPTION OF THE EMBODIMENTS

The present disclosure will be described in detail below with reference to the drawings and embodiments.

Figure 1:
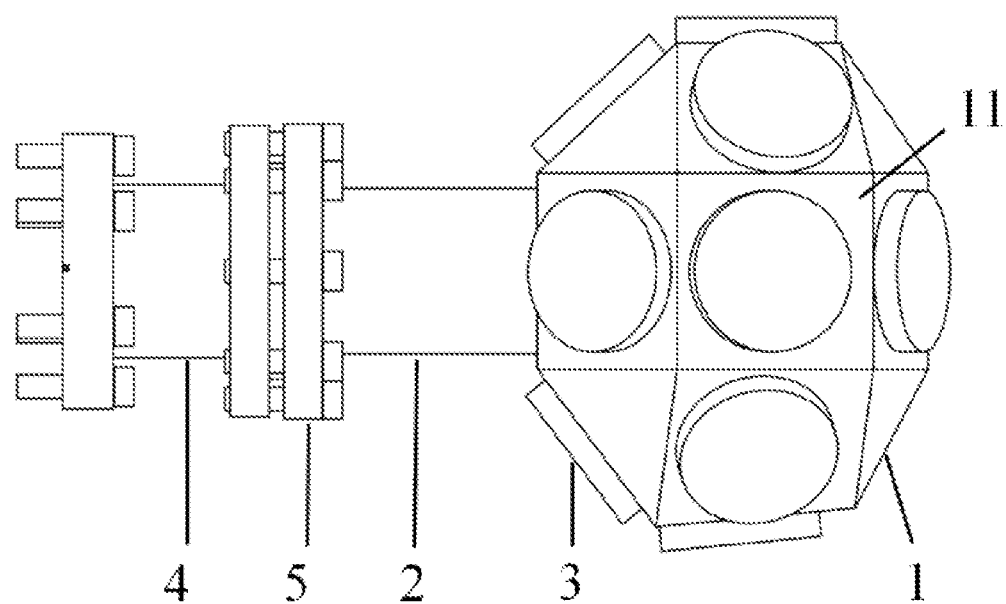
FIG. 1 is a schematic structural diagram of an all-glass optical atom-chamber according to the present disclosure.
Figure 2:
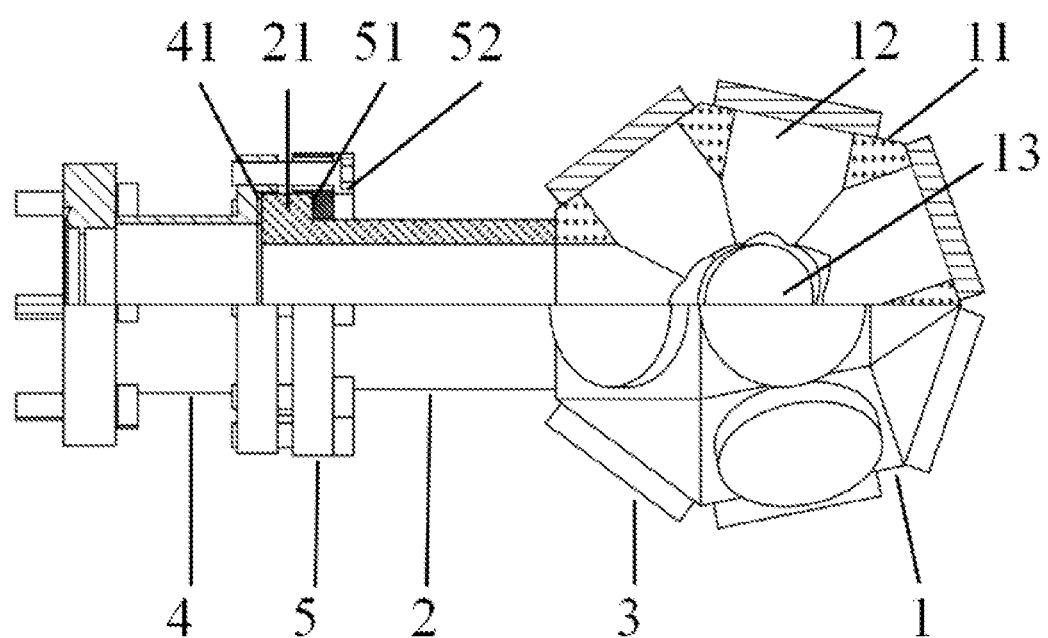
FIG. 2 is a cross-sectional view of FIG. 1.

Referring to FIGS. 1-2, the present disclosure includes an optical vacuum chamber 1, at least one conduit 2, optical window sheets 3, at least one vacuum adapter 4, and pressing sheets 5. The optical vacuum chamber 1 is a polyhedron with planes 11 of any shape. The planes 11 of the polyhedron are provided with respective optical windows 12 therein. Holes of the optical window 12 extending into the polyhedron form a same inner chamber 13.

The optical window 12 is fixed with one of the optical window sheets 3.

One end of the conduit 2 is fixedly connected to the optical vacuum chamber 1, the other end of the conduit 2 is connected to one end of the vacuum adapter 4 through the pressing sheet 5, and the other end of the vacuum adapter 4 is connected to a vacuum pump.

A size of the optical window 12 of the present disclosure is less than a size of the plane 11 where this optical window is located; a size of each of the optical window sheets 3 is greater than the size of the optical window 12, and less than or equal to the size of the plane 11 where the optical window 12 is located.

A light transmission area of each of the optical window sheets 3 of the present disclosure is less than or equal to the size of the optical window 12 where this optical window sheet 3 is located; the optical window sheets 3 are plane or non-plane, and the non-plane is spherical or aspheric; the light transmission area of each of the optical window sheets 3 is coated on both sides.

There are at least one conduit 2 in the present disclosure; an annular boss 21 is provided at one end of the conduit 2.

The vacuum adapter 4 of the present disclosure is a metal tubular flange. One end of the vacuum adapter 4 is provided with a first annular groove 41.

The pressing sheet 5 of the present disclosure is a ring-shaped metal element. A second annular groove 51 is provided on the pressing sheet, and bolt holes 52 are evenly distributed outside around the first and second annular grooves.

Embodiment 1

Figure 3:
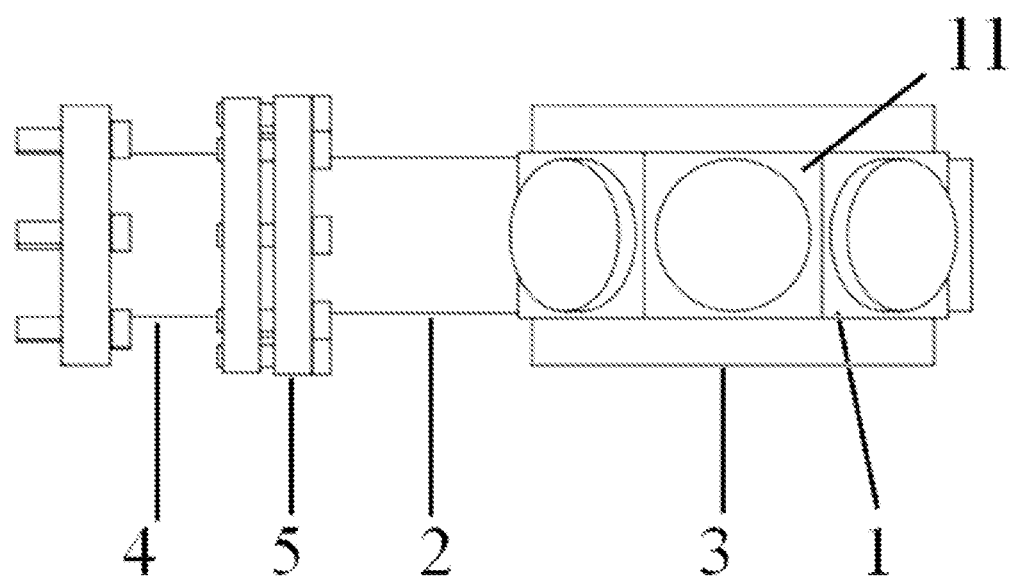
FIG. 3 is a schematic structural diagram of Embodiment 1 according to the present disclosure.
Figure 4:
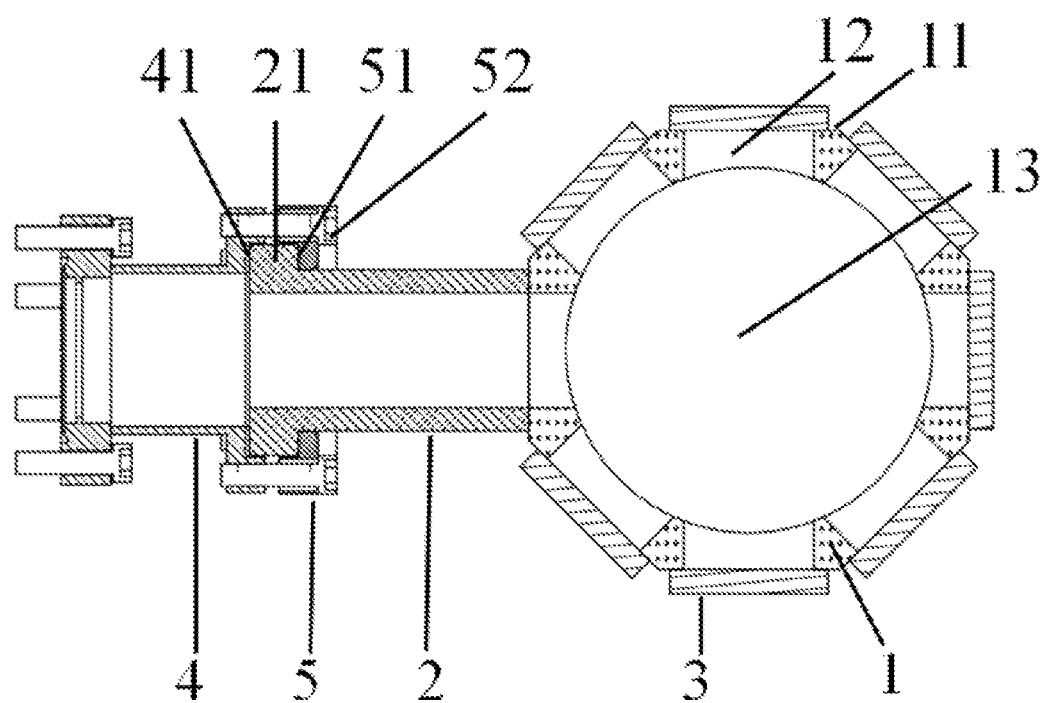
FIG. 4 is a cross-sectional view of FIG. 3.

Referring to FIGS. 3-4, the all-glass optical atom-chamber is provided in this embodiment.

A main glass vacuum chamber body is a straight octagonal prism. An upper surface and a lower surface of the straight octagonal prism are each a regular octagon, and a side length of the regular octagon is 48 mm. A side edge of the straight octagonal prism has a height of 48 mm. Through holes with each a diameter of 34 mm are respectively provided at center positions of eight side surfaces of the straight octagonal prism. Through holes with each a diameter of 95 mm are provided at center positions of the upper surface and the lower surface of the straight octagonal prism respectively. These through holes form the windows and the internal chamber. An inner surface of the chamber is polished, and a polishing index Ra is less than or equal to 1.2 nm.

An upper large window sheet and a lower large window sheet each have a diameter of 107 mm, and the upper large window sheet and the lower large window sheet also have each a thickness of 13 mm. Light transmission areas of the upper large window sheet and of the lower large window sheet are each planar, and each coated with antireflection coating of 780 nm. And the transmittance of these window sheets after being coated is higher than 99%. There are seven small window sheets around, having each a diameter of 41 mm and a thickness of 7 mm. A light transmission area of each of seven small window sheets is planar, coated with an antireflection coating of 780 nm, and the transmittance of the coated small window sheets is higher than 99%.

An outer diameter of the conduit is 42 mm, and a wall thickness thereof is 6 mm. An outer diameter of the boss is 55 mm, and a thickness of the boss is 13 mm. The adapter, the conduit, and the pressing sheet for the adapter are sealed and connected by using indium wires and screws.

Specific preparation process is as follows.

In step 1, a fused quartz glass cylinder with a diameter greater than 135 mm and a thickness greater than 50 mm is taken, and an octagonal prism profile with surfaces having each a rectangular plane is made of this quartz glass material by usage of an optical cold processing method. An inscribed circle of the octagonal prism has a diameter of about 126 mm and a thickness of about 45 mm.

On each of eight side planes of the octagonal prism, an optical window is processed towards inside of the octagonal prism body. The optical window is located at a geometric center of the plane; and this optical window has a diameter of 34 mm. On the upper and lower planes of the octagonal prism, respective optical windows are processed towards the inside of the octagonal prism body, each of the optical windows is located at a geometric center of the plane, and the optical window has a diameter of 95 mm. Extending holes of optical windows form a same inner chamber.

A surface of the inner chamber is polished, and a surface roughness index Ra is less than or equal to 1.2 nm.

In step 2, performing a fine optical surface polishing on all ten planes of the octagonal prism by a classical polishing method. During the polishing process, an ambient temperature is strictly controlled at 22±1 degrees centigrade, and a temperature gradient is less than 0.1 degrees centigrade per hour. Polishing powder obtained by a water separation method is used. More specially, ultra-fine polishing powder of 500 mesh is dissolved in water, stirred fully and precipitated for 24 hours, and then 10% of ultra-fine particles in an upper layer of the precipitated polishing powder are taken for polishing and grinding. An external surface quality should meet the following conditions: the surface accuracy $PV \leqslant \lambda/10$, the surface roughness $Ra \leqslant 0.6$ nm, the surface imperfection B higher than 10-5 under the rules of the US military standard MIL-13830A.

In step 3, the optical window sheets are made of fused quartz material, where seven optical window sheets each have a diameter of 41 mm and a thickness of 6-7 mm, and two optical window sheets each have a diameter of 107 mm and a thickness of 13 mm.

A fine optical surface polishing is performed on two surfaces of each of the optical window sheets by the classical polishing method. During the process, an ambient temperature is strictly controlled at 22±1 degrees centigrade, and a temperature gradient is less than 0.1 degrees centigrade per hour. Polishing powder obtained by a water separation method is used. More specially, ultra-fine polishing powder of 500 mesh is dissolved in water, stirred fully and precipitated for 24 hours, and then 10% of ultra-fine particles in an upper layer of the precipitated polishing powder are taken for polishing and grinding. An optical surface of the optical window sheet which is within a light transmission area has a surface accuracy $PV \leqslant \lambda/10$, a surface roughness $Ra \leqslant 0.6$ nm, and a surface imperfection B higher than 10-5 under the rules of the US military standard MIL-13830A.

A light transmission diameter of the optical window sheet is about 35 mm, and the light transmission area of the optical window sheet is coated on both sides. A coating with the coating is 780 nm antireflection, and a transmittance of the coating with the coating is higher than 99.5%.

In step 4, the conduit is made of fused quartz material, with an annular boss provided at one end thereof. An outer diameter of the conduit is at least 42 mm; a wall thickness of the conduit is 6 mm; an outer diameter of the annular boss is 55 mm; and a thickness thereof is 12 mm. An unevenness of a surface of the annular boss is less than or equal to 0.0002 mm. A flat end of the conduit is connected to the optical vacuum chamber through an optical-contact vacuum-bonding process.

After the optical window is coated and the conduit is processed, a non-coated area of the optical window and the flat end of the conduit are ultrasonically cleaned with deionized water and then cleaned with a alcohol fluid with 99.5% of alcohol.

Under Class 100 of the Old Federal Standard 209E or under Class 5 of the ISO Classification System ISO 14644-1, each optical window, the conduit and the octagonal prism body are sealed and connected by the optical-contact vacuum-bonding process. Premium-grade pure absolute ethyl alcohol, a small amount of premium-grade pure petroleum ether, and dust-free cloth are used together to clean surfaces to be bonded. The two surfaces to be subjected to the optical-contact vacuum-bonding are put together and a pressure (less than 0.2 kg per square centimeter) is applied thereon, so that the molecules of the two surfaces can be adsorbed to each other, so as to complete the optical contact.

An entire body after being performed the optical contact is placed into a vacuum chamber. The vacuum chamber is vacuumed to $10^{-3}$ Pa, heated to 220 degrees centigrade at a heating rate of 2 degrees centigrade per min, and kept at a temperature of 220 degrees centigrade and a pressure of $10^{-3}$ Pa for 24 hours. And then the vacuum chamber is naturally cooled to a room temperature. Therefore, bonds between objects are formed. A tensile strength between the bonded the objects is greater than 4 MPa.

In step 5, the vacuum adapter is a metal tubular flange. One end of the vacuum adapter is a vacuum CF flange structure. The other end of the vacuum adapter is provided with a first annular groove. Bolt holes are evenly distributed outside around the first annular groove. The first annular groove at one end of the vacuum adapter has an inner diameter of 55 mm and a depth of 5 mm.

In step 6, the pressing sheet is a ring-shaped metal element with a second annular groove provided thereon. An inner diameter of the second annular groove is 55 mm, and bolt holes are evenly distributed outside around the second annular groove. The second annular groove of the pressing sheet has a depth of 5 mm.

In step 7, when the vacuum connector is connected to the conduit, first the pressuring sheet is sleeved on an outer side of the conduit, and the second annular groove of the pressuring sheet and the annular boss of the conduit are at the same side. one to two coils of indium wires are placed on a plane of the first annular groove at one end of the vacuum connector. Diameters of the indium wires are 1.5 to 2 mm. The annular boss of the conduit is positioned into the first annular groove of the vacuum connector, and the bolts are screwed into corresponding bolt holes of the vacuum connector and the pressing sheet, so that the indium wires are evenly squeezed and a concave plane of the groove of the vacuum connector and a plane of the annular boss of the conduit are full of the indium wires. Therefore, the vacuum optical atom-chamber is obtained.

In step 8, the whole vacuum optical atom-chamber is connected to the vacuum pump or vacuum equipment through the standard CF flange on the other end of the vacuum connector, so as to reduce and maintain the vacuum degree in the chamber to be higher than $5 \times 10^{-9}$ Torr.

A technical route of the present disclosure realizes a structure that is completely free of metal substances in a working area of the vacuum chamber body, so that the working area will not be interfered by the magnetic field of the stainless steel vacuum chamber. In addition, in an ultra-high vacuum environment, the optical window can be coated on both sides, to effectively ensure light transmission efficiency, reduce light pollution caused by surface refraction, and maintain cleanliness of the optical background of the working area. The compact window arrangement is conducive to reducing the internal vacuum volume, which will promote miniaturization of atomic accelerometers, quantum vacuum measurement, quantum repeaters, etc., and will improve measurement accuracy, and will improve fidelity of quantum information transmission.

What is claimed is:

1. An all-glass optical atom-chamber with a vacuum higher than $1 \times 10^{-8}$ Pa, comprising:
    an optical vacuum chamber, at least one conduit, optical window sheets, at least one vacuum adapter, and pressing sheets; the optical vacuum chamber is a polyhedron with planes of any shape; the planes of the polyhedron are provided with respective optical windows; holes of the optical windows which are extended into the polyhedron form a same inner chamber;
    each of the optical window sheets is fixed on a corresponding one of the optical windows;
    an end of each of the at least one conduit is fixedly connected to the optical vacuum chamber, and an other end of the at least one conduit is connected to one end of the at least one vacuum adapter in one-to-one correspondence through a respective pressing sheet of the pressing sheets, and an other end of each of the at least one vacuum adapter is connected to a vacuum pump.

2. The all-glass optical atom-chamber according to claim 1, wherein a size of each optical window of the optical windows is less than a size of one plane of the planes where the optical window is located; a size of a corresponding one of the optical window sheets is greater than the size of the optical window, and less than or equal to the size of the one plane where the optical window is located.

3. The all-glass optical atom-chamber according to claim 2, wherein a light transmission area of each optical window sheet of the optical window sheets is less than or equal to a size of one optical window of the optical windows where the optical window sheet is located; each of the optical window sheets is planar or non-planar, and the non-planar is spherical; the light transmission area of each of the optical window sheets is coated on both sides.

4. The all-glass optical atom-chamber according to claim 1, wherein a light transmission area of each optical window sheet of the optical window sheets is less than or equal to a size of one optical window of the optical windows where the optical window sheet is located; each of the optical window sheets is planar or non-planar, and the non-planar is spherical; the light transmission area of each of the optical window sheets is coated on both sides.

5. The all-glass optical atom-chamber according to claim 1, wherein an annular boss is provided at the other end of each of the at least one conduit.

6. The all-glass optical atom-chamber according to claim 1, wherein the at least one vacuum adapter is a metal tubular flange; the one end of each of the at least one vacuum adapter is provided with a first annular groove; the pressing sheets are ring-shaped metal elements, a second annular groove is provided on each of the pressing sheets, and bolt holes are evenly distributed outside the first annular groove and second annular groove.

7. A manufacturing method of the all-glass optical atom-chamber with the vacuum higher than $1 \times 10^{-8}$ Pa according to claim 1, wherein the method comprises:
    making a first portion of fused quartz material as a profile of the optical vacuum chamber that is the polyhedron with planes of any shape, through an optical cold processing method; wherein a length of a longest diagonal of the polyhedron is at most 300 mm, a length of a shortest diagonal of the polyhedron is at least 30 mm; processing a corresponding one of the optical windows towards inside of the optical vacuum chamber, on each of the planes of the optical vacuum chamber, wherein extending holes of the optical windows form a same inner chamber, a distance from an edge of each optical window of the optical windows to an edge of one plane of the planes where the optical window is located is at least 5 mm, a thinnest portion of walls of the same inner chamber formed by grinding towards an inside of the polyhedron has a thickness of at least 8 mm; performing a polishing process on inner surfaces of the same inner chamber and the extending holes, wherein a surface roughness index is less than or equal to 1.2 nm;

grinding and polishing an outer surface of the optical vacuum chamber; wherein the outer surface quality meets: a surface accuracy is less than or equal to $\lambda/10$, a surface roughness is less than or equal to 0.6 nm, a surface imperfection is higher than 10-5 under rules of US military standard MIL-13830A;

forming the optical window sheets from a second portion of the fused quartz material; wherein for each of the optical window sheets, a ratio of a diameter or a diagonal length to a thickness is less than or equal to 8:1; a size of each of the optical window sheets is less than or equal to a size of one of the planes where the optical window sheet is located; wherein an optical surface of each of the optical window sheets which is within a light transmission area is another plane, a surface accuracy of the another plane is less than or equal to $\lambda/10$, a surface roughness of the another plane is less than or equal to 0.6 nm, a surface imperfection of the another plane is higher than 10-5 under the rules of the US military standard MIL-13830A, and the optical surface of each of the optical window sheets which is within the light transmission area is a non-plane, a surface roughness of the non-plane is less than or equal to 0.6 nm, a surface imperfection of the non-plane is higher than 10-5 under the rules of the US military standard MIL-13830A; wherein when the optical surface of each of the optical window sheets which is within the light transmission area is the non-plane that is a positive spherical surface or a negative spherical surface; wherein a curvature radius of the positive spherical surface is at least 0.65 times the light transmission area of the optical window sheet; wherein a curvature radius of the negative spherical surface is no more than 1 m; coating a light transmission area of each of the optical window sheets at both sides; connecting the optical window sheets and the optical windows of the optical vacuum chamber through an optical-contact vacuum-bonding process;

forming the at least one conduit from a third portion of the fused quartz material, an end of each of the at least one conduit is provided with the annular boss; wherein an outer diameter of the at least one conduit is at least 40 mm; a wall thickness of the at least one conduit is at least 6 mm; an outer diameter of the annular boss is at least 5 mm more than the outer diameter of the at least one conduit; an unevenness of a surface of the annular boss is less than or equal to 0.0002 mm; a flat end of each of the at least one conduit is connected to the optical vacuum chamber through the optical-contact vacuum-bonding process;

providing the at least one vacuum adapter that is a metal tubular flange; wherein one end of each of the at least one vacuum adapter is a vacuum CF-flange structure; an other end of each of the at least one vacuum adapter is provided with the first annular groove; bolt holes are evenly distributed outside the first annular groove; an inner diameter of the first annular groove at the other end of the at least one vacuum adapter corresponds to the outer diameter of the annular boss of the at least one conduit; and providing the pressing sheets that are ring-shaped metal elements with a second annular groove provided on each of the pressing sheets; wherein an inner diameter of the second annular groove corresponds to the outer diameter of the annular boss of the at least one conduit, and other bolt holes are evenly distributed outside the second annular groove; a sum of a thickness of the first annular groove of each of the at least one vacuum adapter and a thickness of the second annular groove of each of the pressing sheets is less than a thickness of the annular boss of each of the at least one conduit by a range of 1-2 mm;

connecting the at least one vacuum adapter and the at least one conduit in one-to-one correspondence, more specially, firstly sleeving a respective pressing sheet of the pressuring sheets on an outer side of each of the at least one conduit and engaging the second annular groove of the respective pressing sheet with the annular boss of the at least one conduit; placing one coil or two coils of indium wires on a plane of the first annular groove at the other end of the at least one vacuum adapter; wherein diameters of the indium wires are within a range of 1.5 to 2 mm; positioning the annular boss of the at least one conduit within the first annular groove of the at least one vacuum adapter, and screwing bolts into the bolt holes of the at least one vacuum adapter and the other bolt holes of the respective pressing sheet, so that the indium wires are evenly squeezed and an airtight connection is realized between the at least one vacuum adapter and the respective pressing sheet; and obtaining the all-glass optical atom-chamber with the vacuum higher than $1 \times 10^{-8}$ Pa.

8. The manufacturing method according to claim 7, wherein the optical-contact vacuum-bonding process comprises:

optical polishing: performing a fine optical-surface polishing on surfaces of objects by a classical polishing method; controlling strictly an ambient temperature to be 22±1 degrees centigrade, and a temperature gradient is less than 0.1 degrees centigrade per hour; polishing and grinding the surfaces by using polishing powder obtained by a water separation method, preferably, dissolving ultra-fine polishing powder of 500 mesh in water, stirring fully and depositing for 24 hours, and then taking 10% of ultra-fine particles in an upper layer of the polishing powder after being deposited; wherein surface accuracies of the surfaces to be bonded are less than or equal to $\lambda/10$, surface roughness of the surfaces after being polished is less than or equal to 0.6 nm, surface imperfections of the surfaces are higher than 10-5 under the rules of the US military standard MIL-13830A;

optical contact: ultrasonically cleaning the surfaces after being polished by using deionized water, then further cleaning the surfaces by using alcohol fluid with 99.5% of alcohol, and performing the optical contact under Class 100 of Old Federal Standard 209E or under Class 5 of ISO Classification System ISO 14644-1: firstly mixing absolute ethyl alcohol with a purity of greater than 99.9% and petroleum ether with a purity of greater than 99.7% according to a ratio of 9 to 1 to be a mixed liquid; using the mixed liquid and a dust-free cloth to wipe clean the surfaces to be bonded; attaching closely two surfaces of the surfaces to be performed with the optical contact; and applying a pressure of less than 0.2 kg per square centimeter to enable molecules of the two surfaces to attract each other, so as to complete the optical contact; and vacuum bonding: putting an entire body after being performed the optical contact into a vacuum chamber and vacuuming the vacuum chamber to $10^{-3}$ Pa, heating the vacuum chamber to 220 degrees centigrade at a heating rate of 2 degrees centigrade per min, and maintaining the entire body at 220 degrees centigrade and $10^{-3}$ Pa for 24 hours; then naturally cooling the vacuum chamber to a room temperature; and forming bonds between the objects, wherein a tensile strength between the surfaces after being bonded is greater than 4 MPa.

\* \* \* \* \*

UNITED STATES PATENT AND TRADEMARK OFFICE
CERTIFICATE OF CORRECTION

PATENT NO. : 11,181,467 B1  
APPLICATION NO. : 17/363782  
DATED : November 23, 2021  
INVENTOR(S) : Yuelong Wu et al.

Page 1 of 1

It is certified that error appears in the above-identified patent and that said Letters Patent is hereby corrected as shown below:

In the Claims

Column 10, Line 31, in Claim 3:  
Should be:  
- 1, wherein a light transmission area of each optical window -

Column 10, Line 39, in Claim 4:  
Should be:  
- 2, wherein the light transmission area of each optical window -

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*